(12) United States Patent
Gretz

(10) Patent No.: US 7,307,213 B1
(45) Date of Patent: Dec. 11, 2007

(54) HORIZONTAL ELECTRICAL BOX WITH INTERNAL MOUNTING ARRANGEMENT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/637,543

(22) Filed: Dec. 12, 2006

Related U.S. Application Data

(63) Continuation-in-part of application No. 11/287,055, filed on Nov. 25, 2005, now Pat. No. 7,214,875.

(51) Int. Cl.
*H01H 9/02* (2006.01)
(52) U.S. Cl. ............................ 174/58; 174/53; 174/50; 174/481; 220/3.2; 220/3.3; 248/906
(58) Field of Classification Search .................. 174/480, 174/481, 50, 53, 57, 58, 503, 500, 17 R; 220/3.2–3.9, 4.02; 248/906, 343; 439/535, 439/536, 537, 538
See application file for complete search history.

(56) References Cited

U.S. PATENT DOCUMENTS

| 4,297,525 | A | 10/1981 | Bowden, Jr. |
| 5,378,854 | A | 1/1995 | Hoover |
| 5,596,174 | A | 1/1997 | Sapienza |
| 5,600,093 | A | 2/1997 | Herth et al. |
| 5,603,424 | A | 2/1997 | Bordwell et al. |
| 6,909,045 | B2 * | 6/2005 | Halbert ........................ 174/50 |

* cited by examiner

*Primary Examiner*—Angel R. Estrada

(57) ABSTRACT

An electrical box with a snap fit panel including a mounting arrangement. The panel can snap fit against an opening in the sidewall of the electrical box to form an electrical enclosure with an internal mounting arrangement for mounting the electrical box in either new work or old work applications. Providing a mounting arrangement integral with the panel instead of integral with the box provides a significantly larger internal volume than prior art one-piece molded electrical boxes with integral internal mounting arrangements. The internal mounting arrangement provides fasteners internal to the electrical box, thereby enabling retrofitting an old box with no disruption to the surrounding wall.

9 Claims, 8 Drawing Sheets

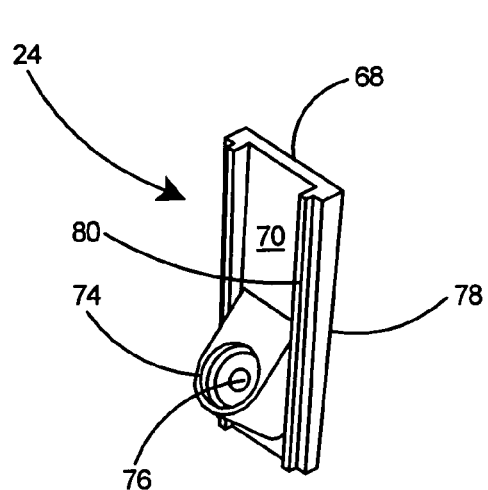 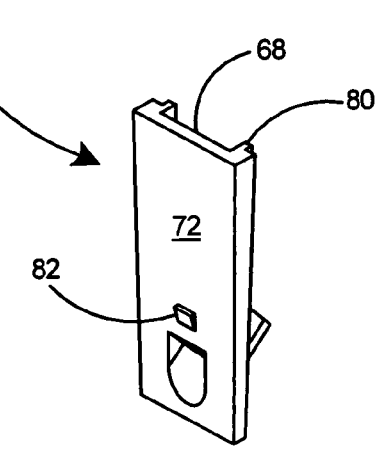
Fig. 6        Fig. 7
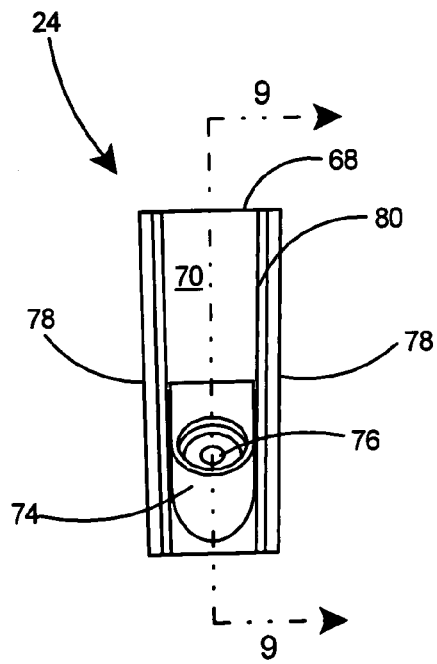 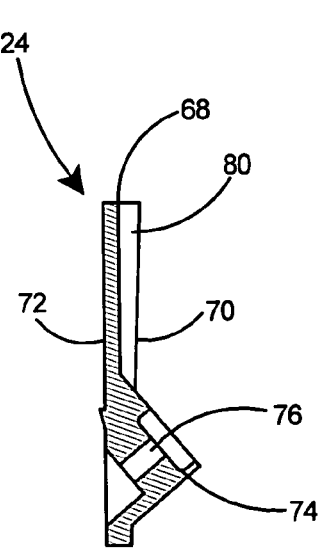 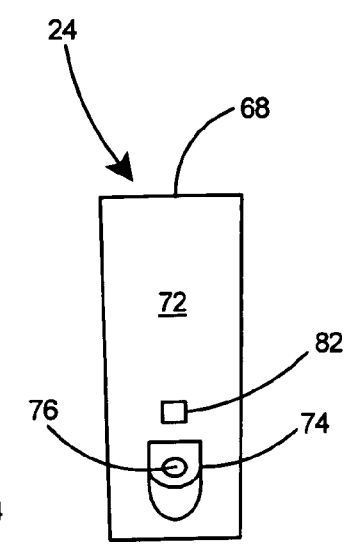
Fig. 8        Fig. 9        Fig. 10

HORIZONTAL ELECTRICAL BOX WITH INTERNAL MOUNTING ARRANGEMENT

This application is a Continuation-In-Part of U.S. patent application Ser. No. 11/287,055 filed Nov. 25, 2005 now U.S. Pat. No. 7,214,875, the entire contents of which are incorporated herein by reference.

FIELD OF THE INVENTION

This invention relates to electrical boxes and specifically to an electrical box having an snap-in internal mounting arrangement for simplifying replacement of existing electrical boxes or for installation as a new work box.

BACKGROUND OF THE INVENTION

With the passage of time it is not uncommon for electrical boxes to become loose from the structures they are mounted to. Frequent attachments of plugs into an electrical outlet over time, for example, can cause the supporting outlet box to become unattached from the structure. The loosened electrical box is then a hazard, as it can cause loosening of wires within the box, electrical shorts, and potentially electrical shocks.

When an electrical box becomes loose, a prime consideration in replacing the box is minimizing damage to the surface surrounding the box. Electrical boxes for interior walls therefore must be capable of being easily installed into and secured to the existing wall without causing damage to the surrounding wall surface.

Electrical boxes have been developed specifically for the replacement of old electrical boxes, which are typically referred to as "old work" boxes. Prior art boxes of this type are described in U.S. Pat. No. 4,297,525 to Bowden, Jr., U.S. Pat. No. 4,120,473 to Suk, U.S. Pat. No. 5,603,424 to Bordwell et al., and U.S. Pat. No. 5,600,093 to Herth et al. In the above patent to Bowden, Jr., a box is shown which employs threaded mounting screws fastened into pawl arms. The pawl arms include tabs extending therefrom. After the box is inserted in an opening in a wall, tightening on the mounting screws urges the tabs linearly toward the box and eventually secures the box to the wall. Suk discloses a box that works in conjunction with a bracket to tighten against the wall. Bordwell et al. discloses a mounting assembly that includes clip-on securement members that are mountable to the outer sidewalls of an electrical box. Each securement member includes a bracket positioned on an external surface of the sidewall and a brace supported by the bracket. The brace is movable on the bracket so as to clamp the box to the mounting wall. Herth et al. discloses a modular interchangeable electrical work box. The work boxes have insert sheaths for fasteners for attaching the work box to a stud.

Although the patents to Bowden, Jr., Suk, and Bordwell et al. disclose electrical boxes for use in old work situations, they all rely on clamping type mechanisms that tighten onto the wall covering of the structure. Unfortunately, the wall covering is typically not a structurally strong portion of the wall. Sheet rock for example is used on interior walls, and is not a high strength material. So although the electrical boxes may clamp onto the wall material, the resulting electrical box is not very strongly attached.

The electrical box disclosed in Herth et al. improves the installation by providing fastener insert sheaths and fasteners. The fasteners are driven into the studs of the wall instead of into the wall covering. Although this is an improvement over the prior art boxes that employ clamping members, as a result of providing the fastener insert sheaths, the one-piece box disclosed by Herth et al. loses a large portion of the internal volume of the box. Therefore, although the box provides a better connection to the wall, the resulting volume within the box is small and provides inadequate space for completing wiring connections within the box.

An improved electrical box for retrofitting on finished walls or for use in new construction was disclosed in co-pending U.S. application Ser. No. 11/287,055, incorporated herein in its entirety and commonly owned by the assignee of the present invention, which included an internal mounting arrangement that was integral with a separate insert portion of the electrical box. By providing the internal mounting arrangement on a separate insert portion, the mounting arrangement is not formed as an integral portion of the box thereby taking up a large amount of otherwise usable volume in the electrical box.

The present invention expands upon the advantages of the electrical box of co-pending U.S. application Ser. No. 11/287,055 by providing a box that can be mounted horizontally and includes a mounting arrangement which is formed on a separate panel and then snap fit to the box to provide an internal mounting arrangement for the electrical box. By providing the mounting arrangement on a separate panel, more usable volume is provided within the box.

SUMMARY OF THE INVENTION

The invention is an electrical box with a snap fit panel containing a mounting arrangement. The panel can snap fit against an opening in the sidewall of the electrical box to form an electrical enclosure with an internal mounting arrangement for mounting the electrical box in either new work or old work applications. Providing a mounting arrangement integral with the panel instead of integral with the box provides a significantly larger internal volume than prior art one-piece molded electrical boxes with integral internal mounting arrangements.

OBJECTS AND ADVANTAGES

A first advantage of the electrical box of the present invention is that it mounts to a structurally sound portion of a building structure, such as a framing stud, rather than clamping to the wall covering as is presently the case with prior art boxes that rely upon clamping members.

Another advantage provided by the electrical box of the present invention is that the mounting arrangement is integral with a separate insert portion of the electrical box rather than with the box itself. As a result, the fastener receptacles formed integral with the insert do not take up a great amount of usable volume within the box, as is the case with prior art boxes in which fastener receptacles are formed integral with the box. Prior art boxes are typically molded in one piece, with the fastener receptacles internal to the box. Molding a box in one piece eliminates a large amount of internal volume and makes it impossible to fit a large electrical component, such as a ground fault receptacle, within the resulting box. The two-piece electrical box of the present invention provides a large internal volume with ample space for bulky devices such as ground fault receptacles.

A further advantage of the electrical box of the present invention is that the entire internal mounting arrangement is enclosed within the confines of the internal enclosure. No portion of the mounting arrangement extends beyond the front edge of the enclosure.

Another significant advantage is that an appropriate tool can easily reach the mounting arrangement, without any interference from the sidewalls or other portions of the box. A tool, such as a screwdriver, can be aligned with the axis of the fasteners and used to drive the fasteners therein without any interfering contact with the sidewalls of the box.

These and other objects and advantages of the present invention will be better understood by reading the following description along with reference to the drawings.

DESCRIPTION OF THE DRAWINGS

FIG. 6 is a perspective view of a preferred embodiment of a panel according to the present invention.

FIG. 7 is a perspective view of the panel similar to FIG. 6 but from a different vantage point.

FIG. 8 is an inside view of the panel of FIG. 6.

FIG. 9 is a sectional view of the panel taken along line 8-8 of FIG. 7.

FIG. 10 is an outside view of the panel of FIG. 6.

TABLE OF NOMENCLATURE

Figure 1:
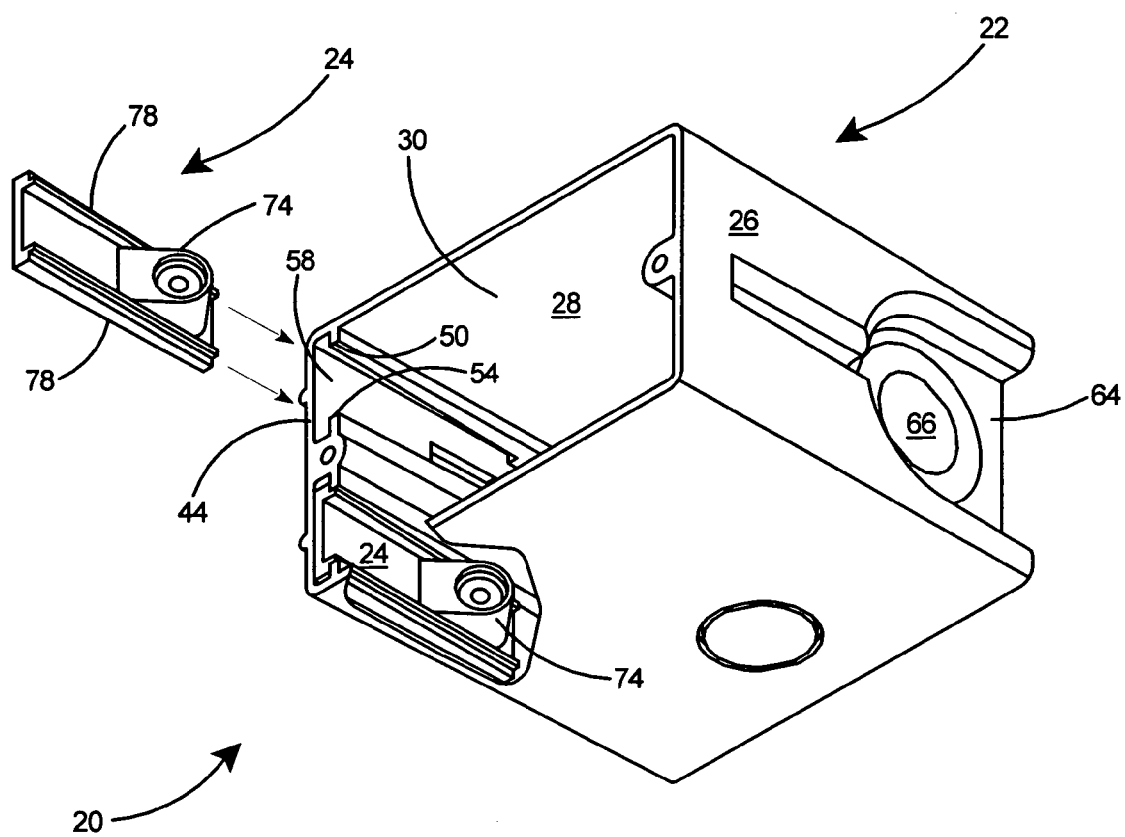
FIG. 1 is an exploded perspective view of a preferred embodiment of an electrical box according to the present invention including a box member and a panel exploded away from the box and in alignment to be inserted therein.

The following is a listing of part numbers used in the drawings along with a brief description:

| Part Number | Description |
| --- | --- |
| 20 | electrical box |
| 22 | box member |
| 24 | panel |
| 26 | sidewall |
| 28 | inner surface of sidewall |
| 30 | enclosure |
| 32 | back wall |
| 34 | removable wall portion |
| 36 | first removable portion |
| 38 | second removable portion |
| 40 | front edge of sidewalls |
| 42 | post |
| 43 | electrical contact point |
| 44 | first sidewall |

-continued

| Part Number | Description |
| --- | --- |
| 46 | opening |
| 50 | first rail |
| 52 | first side of openings |
| 54 | second rail |
| 56 | second side of openings |
| 58 | channel |
| 60 | planar front edge of first opening |
| 62 | second sidewall |
| 64 | recessed area |
| 66 | knockout portion |
| 67 | stop |
| 68 | front edge of panel |
| 70 | inner surface of panel |
| 72 | outer surface of panel |
| 74 | boss |
| 76 | bore |
| 78 | edge of panel |
| 80 | lip |
| 82 | tab |
| 86 | front edge of framing member |
| 88 | framing member |
| 89 | locking arrangement |
| 90 | fastener |
| 92 | fastener axis |
| 94 | sheet rock |
| 96 | wall surface |
| 98 | internal mounting arrangement |
| θ | angle of bore with respect to sidewall of box |
| D | distance of boss from the front edge of the box |
| O1 | offset distance of stop from front edge of box |

DETAILED DESCRIPTION OF THE INVENTION

With reference to a preferred embodiment in FIG. 1, the present invention is an electrical box 20 comprised of a box member 22 and a snap fit panel 24 for securing an electrical device such as a duplex outlet (not shown) or similar electrical device in a wall. The electrical box 20 is shown in FIG. 1 with the panel 24 in alignment with the box member 22 and in alignment to be snapped thereto. The box member 22 includes sidewalls 26 having inner surfaces 28 and defining an enclosure 30 therein.

Figure 2:
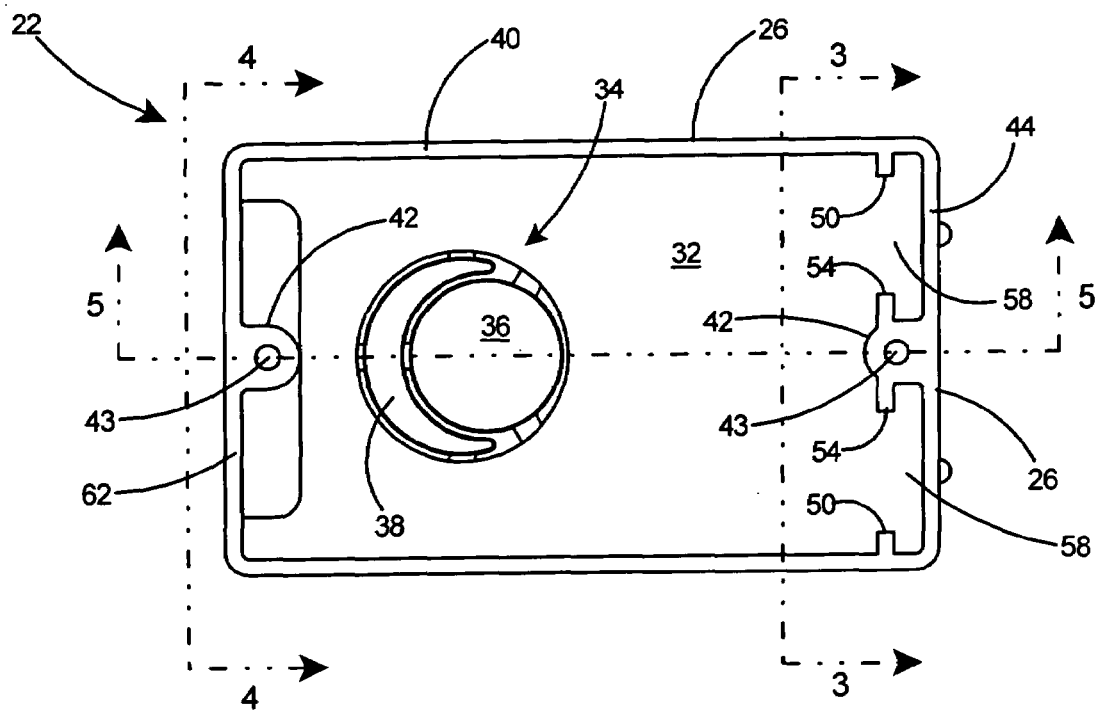
FIG. 2 is a front view of a preferred embodiment of a box member according to the present invention.

Referring to FIG. 2 there is shown a preferred embodiment of a box member 22 according to the present invention. The box member 22 includes a back wall 32 and a removable wall portion 34 including a first removable portion 36 and a second removable portion 38. The first removable wall portion 36 is of a smaller diameter than the second removable wall portion 38. One or both of the removable wall portions 34 and 36 can be selectively removed to later accommodate different sizes of electrical fittings (not shown) for connecting wiring to the interior of the box member 22. The sidewalls 26 include a front edge 40 and integral posts 42 extending from the front edge 40 along two of the sidewalls 26 to the back wall 32 of the box member 22. The posts 42 include bores or electrical component contact points 43 capable of receiving fasteners of an electrical device (not shown) therein.

Figure 3:
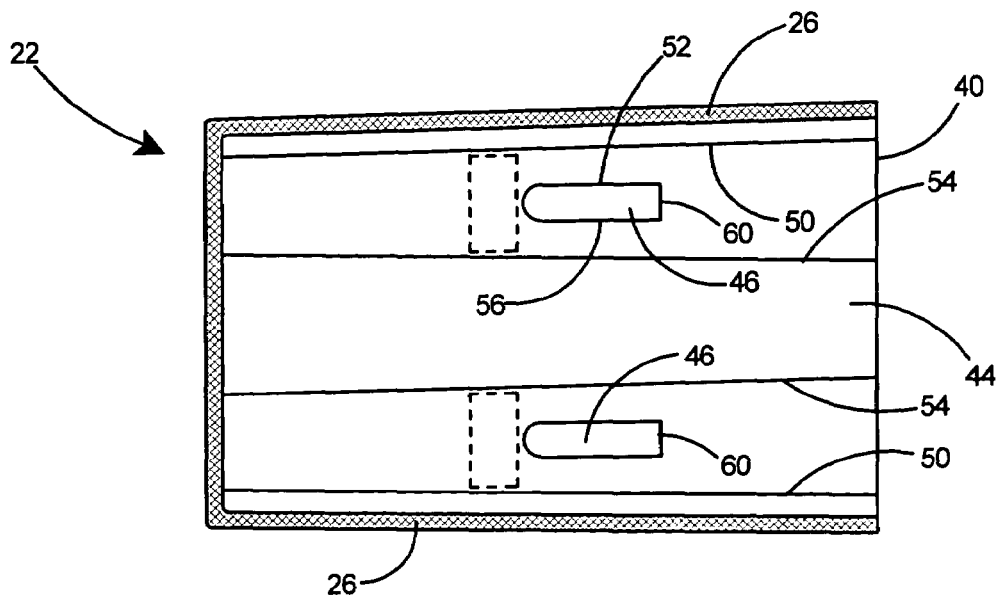
FIG. 3 is a sectional view of the box member taken along line 3-3 FIG. 2.

With reference to FIGS. 2 and 3, the box member 22 includes a first sidewall 44 that is adapted to receive the snap fit panel 24 (see FIG. 1). The first sidewall 44 includes an opening 46 therein. A first rail 50 extends along a first side 52 of the opening 46 and a second rail 54 extends along a second side 56 of the opening 46. The first 50 and second 54 rails define a channel 58 (see FIG. 2) in the box member 22 formed between the rails and the first sidewall 44. The opening 46 includes a planar front edge 60 as shown.

Figure 4:
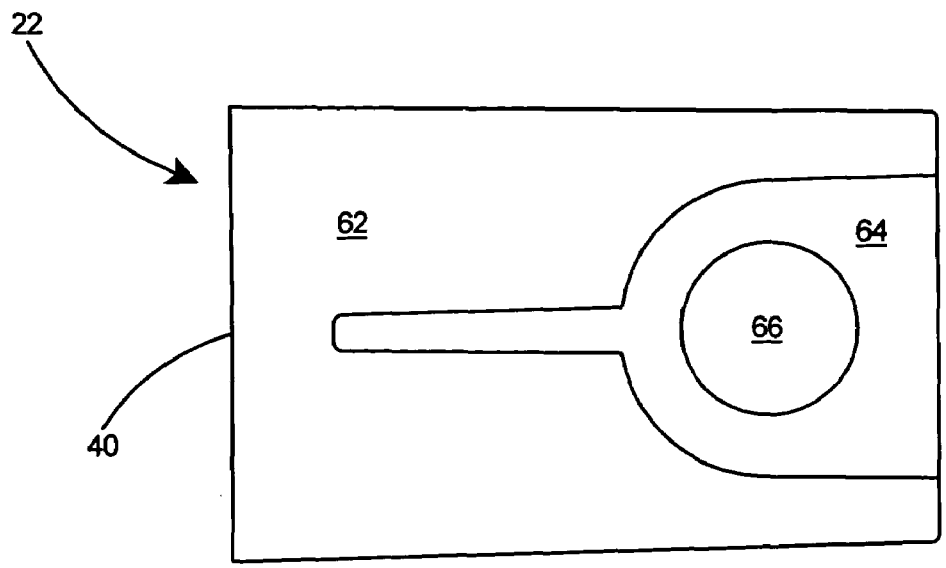
FIG. 4 is a side view of the box member taken from line 4-4 of FIG. 2.
Figure 5:
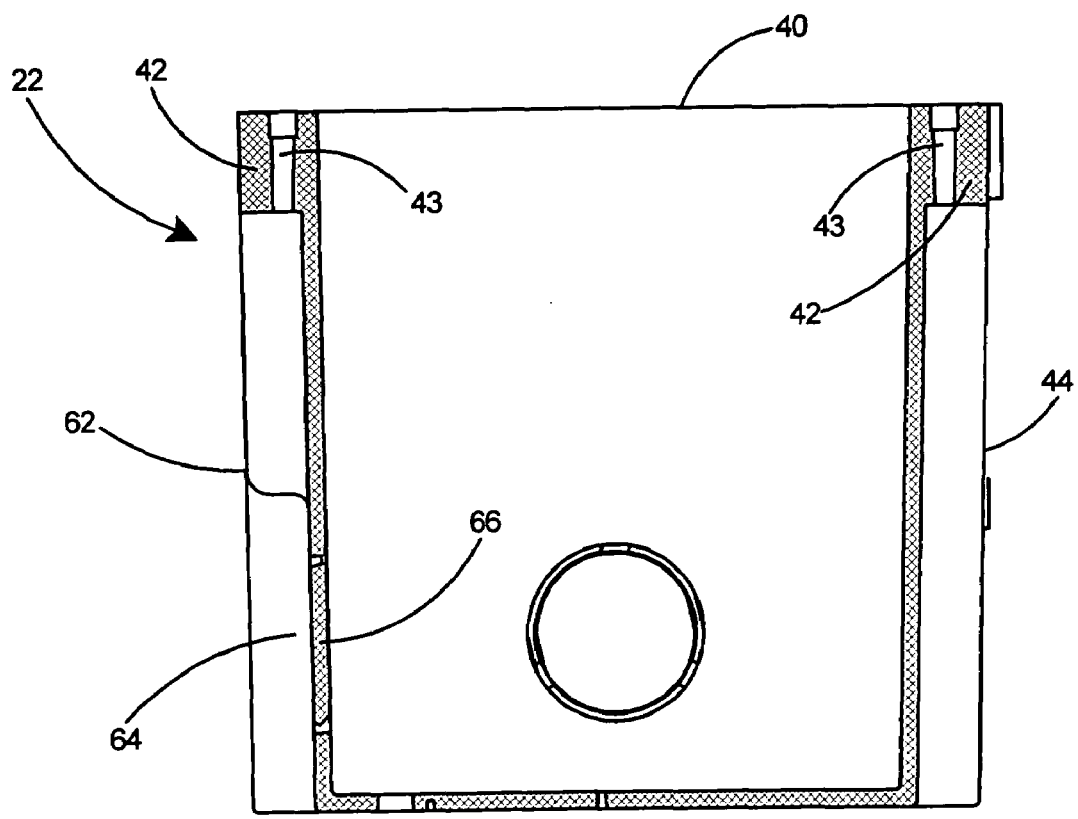
FIG. 5 is a sectional view of the box member taken along line 5-5 of FIG. 2.

As shown in FIGS. 4 and 5, the box member 22 includes a second sidewall 62 opposite the first sidewall 44. The second sidewall 62 includes a recessed area 64 including a knockout portion 66 therein. The recessed area 64 enables connection of fittings, such as the Black Button™ fitting available from Arlington Industries, Inc., of Scranton, Pa., within the knockout 66. The recessed area 64 enables the fitting to be connected to the second sidewall 62 of the box member 22 without extending beyond the outer surface of the sidewall. The outer surface of the box member 22 also includes integral stops 67 extending from the first sidewall 44 near the front edge 40 of the box member 22.

With reference to FIGS. 6-10, a preferred embodiment of the panel 24 includes a front edge 68, an inner surface 70 and an outer surface 72, and a boss 74 extending from the inner surface 70. The boss 74 includes a bore 76 therein and is situated a distance D from the front edge 68 of the panel 24. The panel 24 further includes edges 78, a lip 80 extending along each of the edges 78, and an outward extending tab 82 on the outer surface 72.

Figure 11:
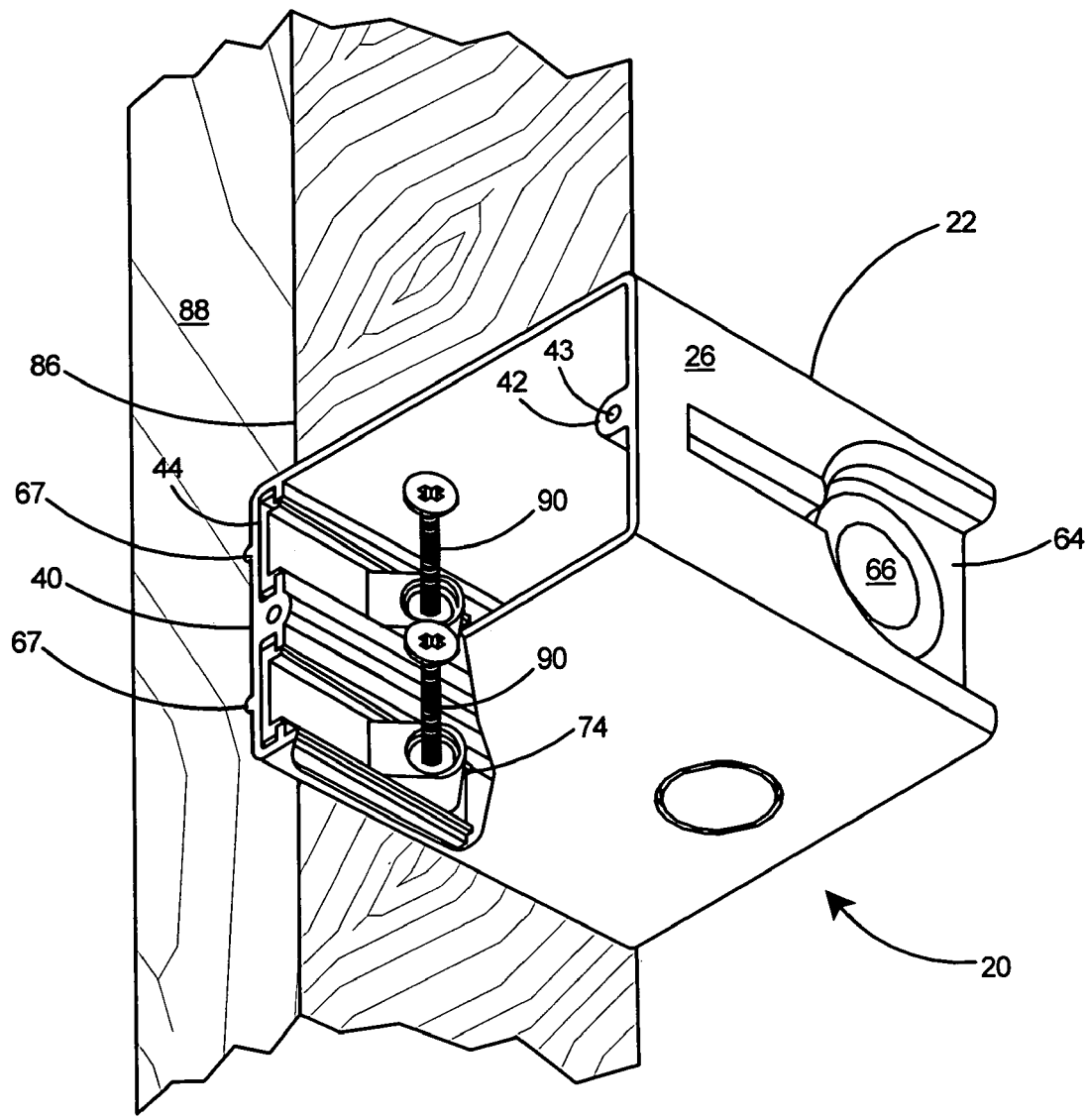
FIG. 11 is a perspective view of a the electrical box of the present invention with the panels inserted therein and in alignment with a framing member prior to being fastened thereto.

As shown in FIG. 11, the stops 67 extending from the first sidewall 44 of the box member 22 enable rapid alignment with the front edge 86 of a framing member 88 and position the front edge 40 of the box member 22 at a predetermined offset from the front edge 86 of the framing member 88. The length of the stop 67 determines the amount of offset and is preferably 0.5 inch to allow for ½" thick sheet rock to be applied to the framing member 88. The offset ensures that the front edge 40 of the box member 22 will be substantially even with the outer face of the sheet rock (not shown).

Referring to FIG. 1, the edges 78 of the panel 24 are snap fit into the channel 58 of the box member 22 by sliding the panel 24 into the channel 58 defined by the rails 50 and 54 that are integral with the first sidewall 44 of the box member 22.

Figure 1A:
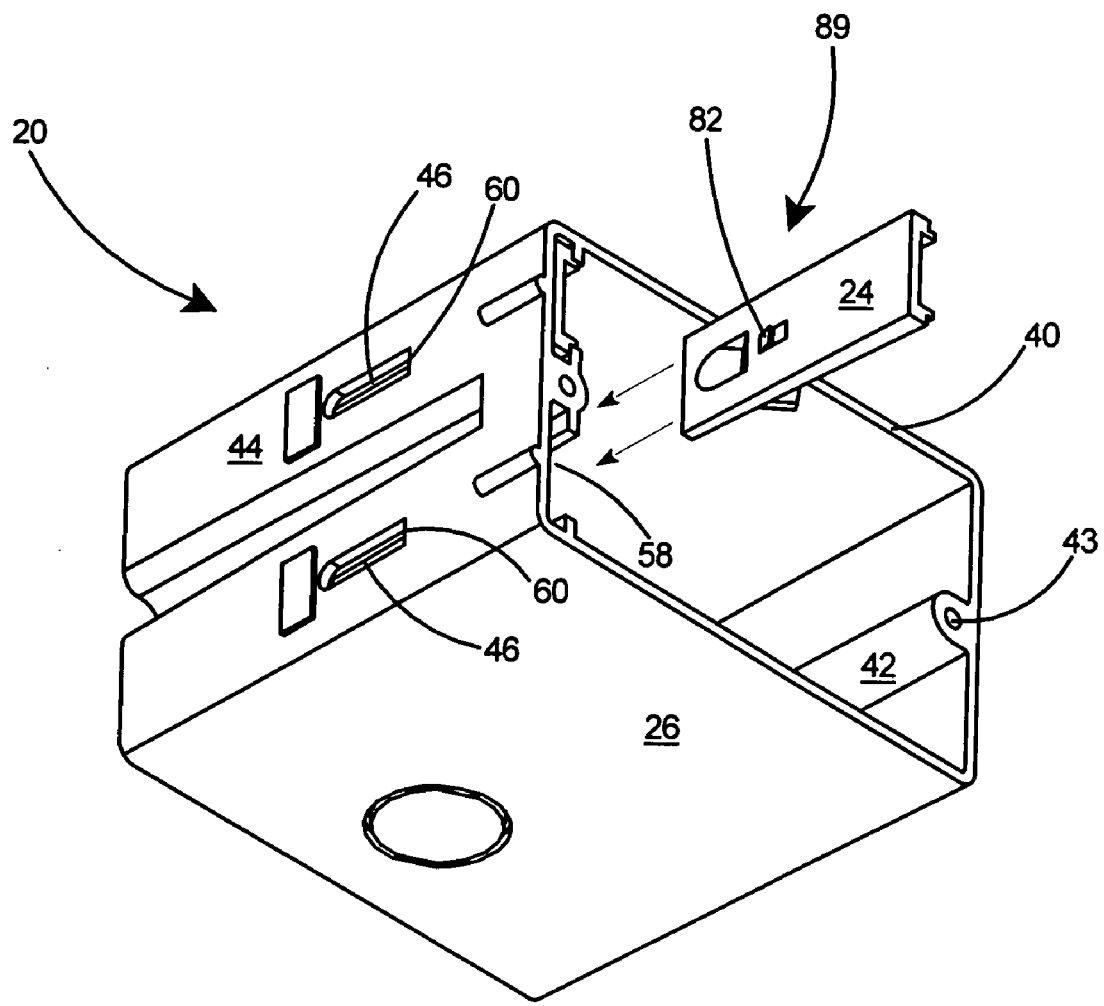
FIG. 1A is an exploded perspective view similar to FIG. 1 but from a different vantage point.

As shown in FIG. 1A, when the panel 24 is fully advanced into the channel 58, the outward extending tab 82 of the panel 24 snap fits into the opening 46 of the first sidewall 44 and locks against the planar front edge 60 of the opening 46. The channel 58 and opening 46 of the box member 22 and the tab 82 on the panel 24 thereby form a locking arrangement 89 for snap fitting and locking the panel 24 to the box member 22.

Figure 12:
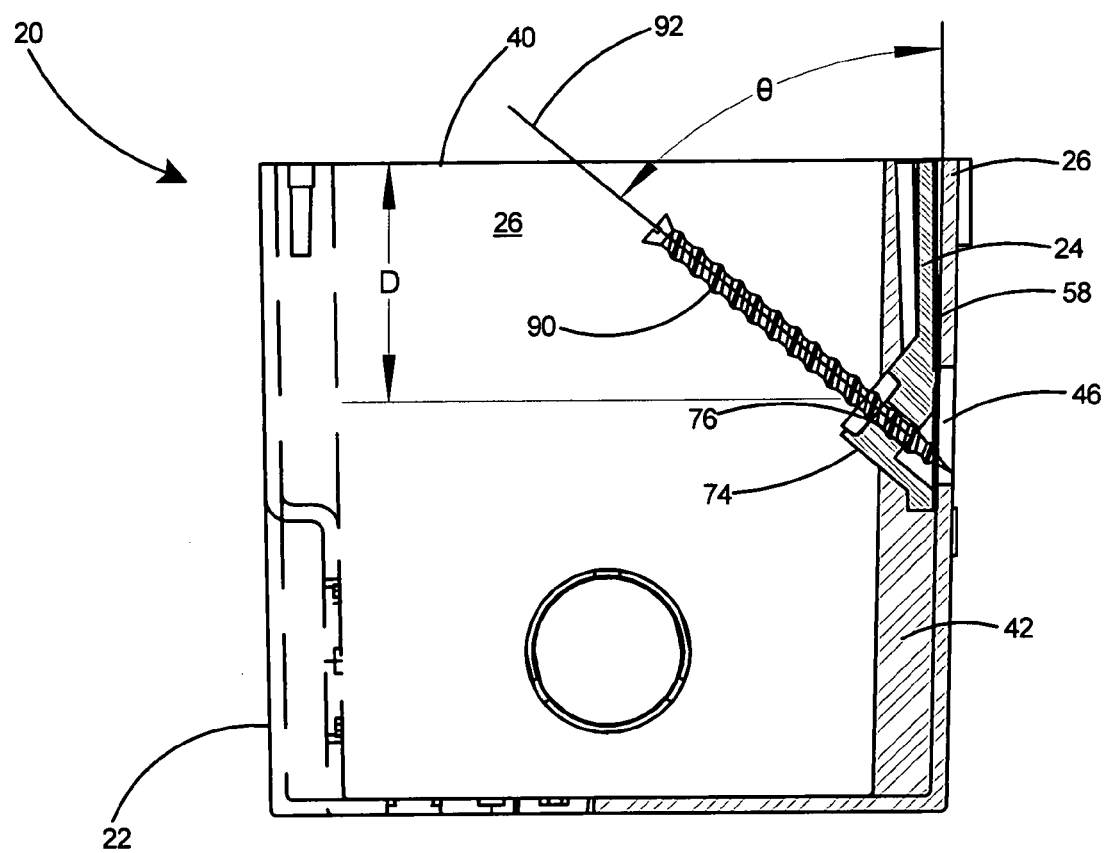
FIG. 12 is a sectional view of the electrical box assembly of the present invention.

After the panel 24 is snap fit into the channel 58, as shown in FIG. 12, the opening 46 of the box member 22 is in alignment with the bore 76 of the boss 74 on panel 24. A fastener 90 is inserted partially within boss 74 and is frictionally held therein. The distance D of the bore 76 from the front edge 40 of the box member 22 and the angle θ of the bore 76 with respect to the sidewall 26 aligns axis 92 of the fastener 90 clear of the sidewalls 26 and the front edge 40 of the box member 22. As a result of the distance D of the bore 76 from the front edge 40 and the angle θ of the bore 76 with respect to the sidewalls 26, the axis 92 of the fastener 90 is clear of interference from the sidewalls 26 and the fastener 90 is easily accessible with an appropriate tightening tool such as a screwdriver (not shown).

The horizontal electrical box 20 of the present invention is provided in an assembled state, as shown in FIG. 12, with the panel 24 locked into the channel 58 of the box member 22 and the fastener 90 secured partially in the boss 74 but not extending beyond the outer surface of the sidewall 26. The fasteners 90 are therefore provided as captive fasteners, which are available to the installer at the time they are needed for installation. By providing captive fasteners 90 with the electrical box 20 the installer is saved the trouble of finding appropriate fasteners of the correct size and load bearing strength for supporting the electrical box 20.

In a preferred embodiment of the electrical box 20 as shown in FIG. 12, the angle θ of the bore 76 with respect to the sidewall 26 of the box member 22 is preferably between 45 and 55 degrees. Most preferably, the angle θ of the bore 76 with respect to the sidewall 26 of the box member 22 is 50 degrees.

Figure 13:
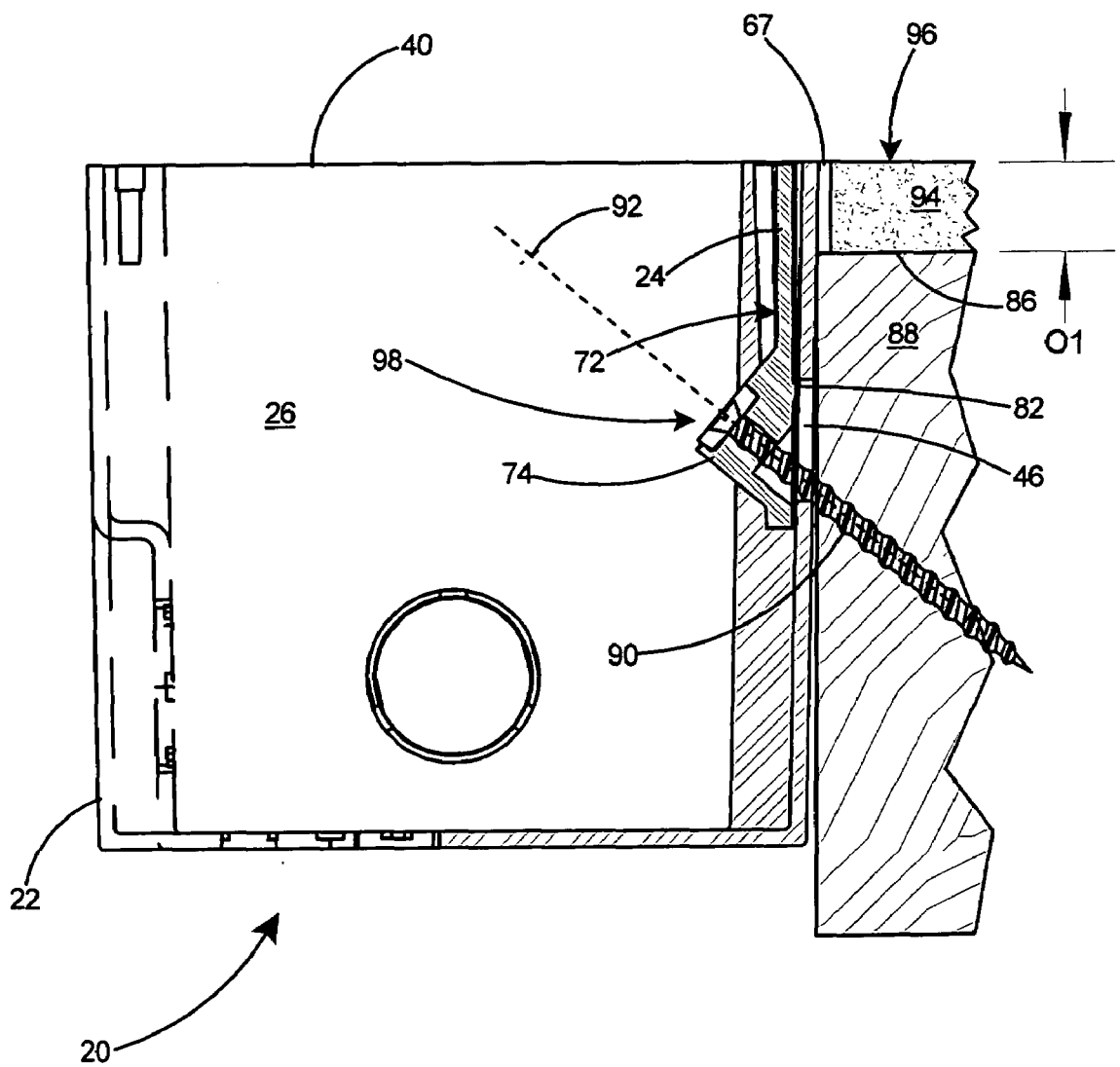
FIG. 13 is a sectional view of the electrical box assembly of the present invention secured to a framing member.

For operation of the present invention, reference is made to FIG. 13. The electrical box assembly 20 is first aligned with a framing member 88 by sliding the electrical box 20 until the stops 67 are flush with the front edge 86 of the framing member 88. This provides the proper offset distance O1 to accommodate a layer of sheet rock 94 to form the wall surface 96. The captive fasteners 90 can then be easily accessed by a conventional tool such as a screwdriver (not shown) and tightened to secure the box member 22 to the framing member 88. With the fastener 90 tightened completely into the framing member 88 as shown in FIG. 13, the electrical box assembly 20 is secure to the framing member 88 and the fastener 90 further locks the panel 24 to the box member 22. Thus, after tightening the fastener 90 through the opening 46 of the box member 22, the box member 22 and the panel 24 are locked together by the fastener 90 in addition to the snap fit of the tab 82 within the opening 46. The boss 74 integral with and extending from the inner surface 70 of the panel 24 and the fastener 90 partially inserted and frictionally held within the boss 74 thereby form an internal mounting arrangement 98 for securing the panel 24 to the box member 22 and framing member 88.

With reference to FIG. 1, the box member 22 of the present invention is preferably molded of plastic or formed of metal in one piece. The panel 24 is also preferably molded of plastic or formed of metal in one piece. Plastics suitable for forming the box member and panel include polyvinyl chloride or polycarbonate.

Having thus described the invention with reference to a preferred embodiment, it is to be understood that the invention is not so limited by the description herein but is defined as follows by the appended claims.

What is claimed is:

1. An electrical box comprising:
   a box member including sidewalls having an inner surface and defining an enclosure;
   an opening in one of said sidewalls of said box member;
   a panel secured against an inner surface of one of said sidewalls of said box member in alignment with said opening, said panel including an inner surface;
   a locking arrangement for snap fitting said panel in said opening;
   a first rail extending along a first edge of said opening
   a second rail extending along a second edge of said opening;
   a channel in said box member formed between said rails and said sidewall including said opening; and
   a mounting arrangement on said panel for securing said box member to a framing member.

2. The electrical box of claim 1 wherein said mounting arrangement includes
   a boss integral with and extending from said inner surface of said panel; and
   a fastener partially inserted and frictionally held within said boss.

3. The electrical box of claim 2 wherein
said boss includes a bore; and
said bore in said panel is at an angle with respect to said sidewall.

4. The electrical box of claim 3 wherein
said box member includes a front edge;
said bore includes a distance from said front edge of said box member; and
said distance of said bore and said angle of said bore position said fastener clear of said sidewalls and said front edge of said box member.

5. The electrical box of claim 1 wherein said panel includes edges and a lip extending along each of said edges.

6. The electrical box of claim 5 wherein said edges of said panel are received in said channel of said box member.

7. The electrical box of claim 6 wherein
said panel includes an inner surface and an outer surface; and
said outer surface of said panel includes an outward extending tab.

8. The electrical box of claim 7 wherein
said opening in said sidewall of said box member includes an edge; and
said outward extending tab of said panel snap fits into said opening of said sidewall and locks against said edge when said panel is placed therein in said channel.

9. An electrical box comprising:
a box member including sidewalls having an inner surface and defining an enclosure;
an opening in a first of said sidewalls of said box member;
a panel secured against an inner surface of said first sidewalls of said box member in alignment with said opening, said panel including an inner surface;
a locking arrangement for snap fitting said panel in said opening;
a mounting arrangement on said panel for securing said box member to a framing member;
a pair of rails extending along opposite sides of said opening in said first sidewall;
a channel in said box member formed between said rails and said first sidewall; and
said channel guiding said panel toward snap fitting engagement with said box member.

* * * * *